April 14, 1964     H. MANDROIAN     3,128,988

TURBINE DRIVEN AIR BEARING DENTAL HANDPIECE

Filed Oct. 11, 1960

*INVENTOR.*
HAROLD MANDROIAN

BY *R. E. Geangue*

ATTORNEY

United States Patent Office 3,128,988
Patented Apr. 14, 1964

3,128,988
TURBINE DRIVEN AIR BEARING DENTAL
HANDPIECE
Harold Mandroian, La Canada, Calif., assignor to
Spacelabs, Inc., Van Nuys, Calif., a corporation of
California
Filed Oct. 11, 1960, Ser. No. 62,004
2 Claims. (Cl. 253—2)

This invention relates to dental handpieces and particularly to a dental handpiece having an air-driven turbine which is supported by an air bearing.

The present invention comprises a dental handpiece for driving dental drills or burrs and employs an air-driven turbine which will operate at speeds of the order of 250,000 r.p.m. In addition to driving the turbine rotor, the air also serves as a fluid bearing to support the turbine rotor. Besides the technical advantages of long life coupled with high-speed operation, patient reaction to the inherently low noise level of such a device is more favorable than with prior types of turbine driven dental handpieces.

Air-driven turbines have been proposed heretofore to power dental handpieces. These devices have employed ball bearings to support the axial and radial loads of the rotor. Experience has shown that ball bearings are unsuitable at speeds exceeding 10,000 r.p.m. and their wear is aggravated by the application of eccentric loads. An attendent disadvantage of ball bearings is the excessive amount of noise which they develop. Also, ball bearings must be lubricated to operate satisfactorily at high speeds and lubrication of a dental handpiece is particularly difficult because of the necessity to maintain the apparatus scrupulously clean.

The use of speeds exceeding 100,000 r.p.m. permits the use of a smooth taper tool without a sharply defined cutting edge since an ultrasonic abrasive effect will result.

Air bearings have been developed heretofore principally for use with gyroscopes and other devices having a large inertia of the rotating member. The configuration of air bearings for rotative elements having a large inertia differ substantially from that required by the present application in which the turbine rotor has a very small inertia. Another problem area which arises in the present instance is in the extreme reduction in size of the rotating element as compared with the size of air bearings used in conventional rotating equipment. For example, the tip dimensions of the dental handpiece of the present invention are of the order of 0.38 inch diameter and 0.62 inch long, maximum. The torque developed by the turbine at 200,000 r.p.m. is approximately 2 gram centimeters. Design principles of the prior art air-bearings are inapplicable to the present problem since they would result in a turbine rotor which would be subject to galling during coast down. To overcome the problem of galling, the present invention employs dynamic braking in which the pump action of the turbine decelerates the rotor very rapidly. Normal gas bearings would not gall unless the bearing area is very small (conventional mounting). By using the turbine rotor O.D. as the bearing surface, there is provided by the present invention much more area and a higher surface speed, permitting the rotor to coast down to a lower speed before the hydrodynamic action is not sufficient to support the rotor. The pumping action further helps by providing some air to support the bearing to still a lower speed.

Other novel features of the invention include the use of a single air source to supply both the bearing and the turbine drive without the necessity of intermediate regulators.

It is, then, an object of the invention to provide a novel turbine driven air bearing dental handpiece which automatically reacts to applied axial and radial thrust loads while supporting a rotor turning at very high speeds.

Another object is to provide an air bearing which is stable and which is angularly self alining.

Other objects and novel features of the invention are pointed out in the following specification, claims, and illustrations in the accompanying drawings which describe by way of example the principle of the invention and the best mode which has been contemplated of applying that principle.

Figure 1:
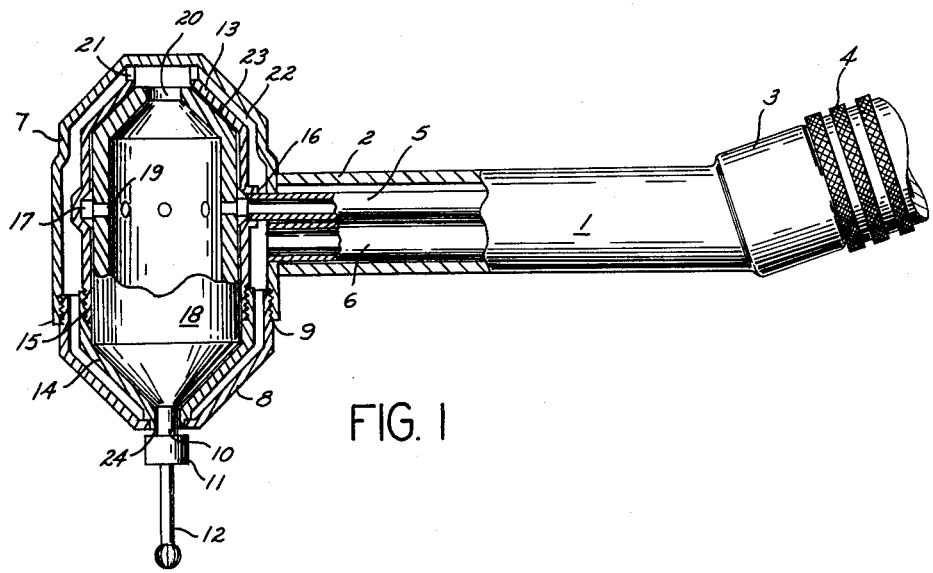
FIGURE 1 is a fragmentary elevational view, partially in section, of a dental handpiece according to the invention.

Looking now at FIGURE 1 there is shown a dental handpiece 1 carrying the turbine housing and the outer cover of said housing. Tubular member 2 serves as a handle as well as the supporting member for the turbine drive assembly. A portion of handle 2 may be angularly offset from portion 3 of the handle to facilitate its handling. Portion 3 may carry knurled bands 4 to facilitate holding and/or gripping of the device. Tubular member 2 carries within its hollow interior an air supply line 5 and an air return line 6. Tubular member 2 is attached to exterior shell 7 by any suitable means such as by welding. To facilitate maintenance, shield 7 carries a removable cover 8 which is attached to shell 7 by means of threaded portion 9. The lower end of cover 8 is provided with a central aperture through which passes the tool collet 10 and chuck 11 adapted to receive tool 12. Tool 12 may comprise a burr, stone, drill, etc. as will be obvious to those skilled in the art. Turbine housing 13 is rigidly attached to, and carried within, cover 7. Cap 14 is carried at the lower end of housing 13 and is attached thereto by threaded portion 15. Housing 13 is provided with boss 16 having an aperture therein through which air from supply line 5 may pass. Boss 16 communicates with an annular recess 17 circumferentially disposed about turbine rotor 18.

Turbine rotor 18 carries a plurality of radially arrayed nozzles, of which 19 is typical, disposed coaxially with respect to annular recess 17. These nozzles communicate the exterior with the hollow interior of rotor 18. Aperture 20 in turbine 18 provides an exhaust path for the exit gas from nozzles 19. A plurality of slots 21 provide a passage for exit air to the interstice 22 between housing 13 and shell 7. The air-return line 6 communicates with interstice 22. An exhaust aperture 24 is also provided between collet 10 and the surrounding portion of cap 14 and cover 8. A bearing area 23 is provided by the separation of housing 13 and the exterior surface of turbine rotor 18. Pressurized air at approximately 60 pounds per square inch gage (p.s.i.g.) enters the annular recess 17 between the housing 13 and the rotor 18 and is distributed annularly as well as axially along the rotor thus pressurizing the bearing area 23. Near the midpoint of the longitudinal axis of the rotor 18, a plurality of turbine nozzles have been machined from the exterior to the hollow interior 25 of the rotor. In the embodiment shown in FIGURES 1 and 3, there are eight such nozzles of which the one identified by the character 19 is typical.

Annular recess 17 surrounding the midpoint of he rotor serves as a variable-area channel, causing a constant change (increase) in air velocity, and therefore, air pressure, throughout the length of the rotor cylinder. As the cylinder is urged to move from the center of the bearing, due to any external loading, the velocity ratio from the center to the end of the cylinder changes in such a way as to cause a decrease in average pressure on the maximum clearance side, and an increase on the minimum clearance side, thus resulting in restoring forces tending to recenter the rotor cylinder.

This is in contrast to a constant area bearing in which air traveling along the axis of the bearing tends to create forces that are unstable. The tendency for the rotor cylinder to move from the true center increases as the rotor cylinder is displaced, thus resulting in an unstable condition; complete failure being prevented only by the hydrodynamic action of the rotating cylinder. This is overcome in the present invention by the variable area channel 17.

The portion of the bearing area 23 communicating with apertures 20 and 24 as well as the interior 25 of the rotor are essentially at atmospheric pressure. Therefore, the air flows through the rotor turbine nozzles 9 imparting a rotational force to the rotor 18 which is proportional to pressure drop and nozzle cross-sectional area. Exhaust air is withdrawn through air return line 6 which may be somewhat larger than air supply line 5. If desired, a vacuum may be applied to the air return conduit 6; this would permit the use of a somewhat smaller line.

As will be obvious to those skilled-in-the-art, cover 8 and chuck 10 may incorporate a holding fixture which permits the collet 11 to be held stationary while inserting or withdrawing burrs from the chuck 10.

Figure 3:
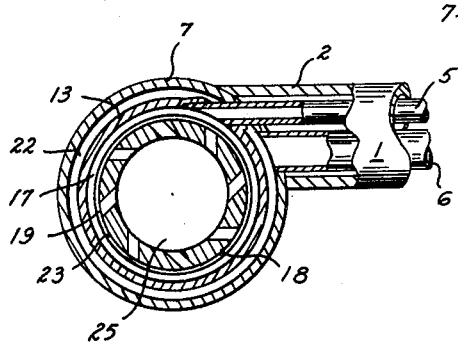
FIGURE 3 is a sectional view of a portion of the apparatus of FIGURE 1 and illustrates the relation of the turbine rotor to its housing.

The rotor configuration disclosed in FIGURE 3 is a comprise between maximum obtainable torque and construction considerations leading to long life. Some efficiency has been sacrificed in order to obtain the desired degree of thrust compensation, dynamic braking and ease of fabrication. By constructing the turbine rotor 18 from carbon or other suitable material having adequate structural strength and a low coefficient of friction, wear during the final revolutions of coast down is effectively overcome. An excessive coast down period would result unless dynamic braking is applied. Dynamic braking also supplies some air to the bearing during coast down, thus increasing the load capacity from a pure hydrodynamic coast down.

Figure 2:
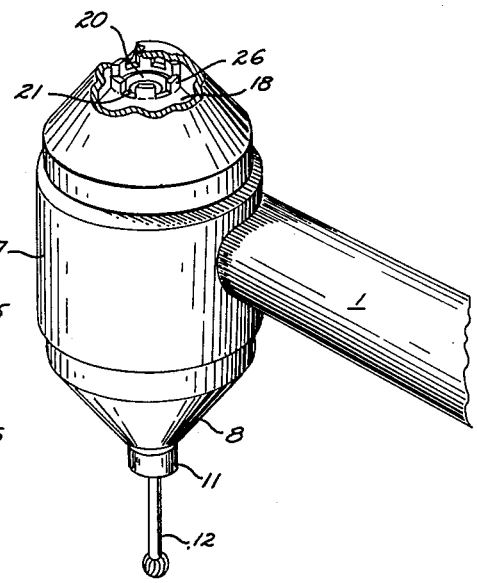
FIGURE 2 is a fragmentary perspective view of the invention showing the coaxial arrangement of the turbine housing and its outer cover.

The rotor element shown in FIGURE 2 is a radial inflow impulse reaction type turbine. The majority of the thrust is obtained by diverting the air stream through 90 degrees from the periphery of the rotor to the hollow core. This 90 degree angle is less than that normally obtainable with a Terry-type or axial-flow turbine. However, the loss resulting from a limited turning angle is offset by the advantages mentioned above.

The air bearing of the invention is of the hydrodynamic hydrostatic type and is unique in that there are no pressure pads or individual metering orifices. Air bearing turbines have not been successfully employed in handpieces heretofore because of the virtual impossibility of adapting standard type air bearings to air driven turbines without the use of seals or bleeds to make possible the control mechanism necessary for the operation of a hydrostatic bearing.

The bearing configuration of the invention provides means for feeding air both to the bearing and the turbine from the same feed point surrounding the entire periphery of the shaft. Air can be bled off from the turbine without any effect upon bearing performance.

It is desirable in an air bearing to have the largest possible area practical because of the limited load capacity which exists as compared with conventional liquid lubricated journal bearings. This apparent defficiency is most easily overcome by employing the largest possible diameter and the longest practical axial length. In order to obtain the highest turbine efficiency it is also desirable to have the largest possible turbine diameter.

Apertures 20 and 24, and the center of the rotor 18, are essentially at atmospheric pressure; therefore, the air flows through the rotor turbine nozzle imparting a rotational force proportional to pressure drop and nozzle cross-sectional area.

Hydrostatic bearing action is established practically immediately upon admission of air, thereby minimizing starting friction and wear. In addition, when the air supply is cut off, the rotor acts as a pump causing it to stop by itself within an extremely short time span.

Inasmuch as most of the exhaust air is returned through line 6 rather than through aperture 24 there is no annoying air leakage in the hand piece; cheek flapping is thereby overcome.

While there has been shown and described a preferred embodiment of the invention, it will be obvious that modifications may be made for adapting the novel turbine and bearing structure to various types and styles of dental handpieces.

The operation of the device need not be limited to pressurized air, but may be operated by means of any suitable gas. Furthermore, a vacuum may be applied to the exhaust line rather than supplying the turbine with fluid from a pressurized source. Also, the gas supplied to drive the turbine and to support the rotor may be cooled or heated by external means. The gas normally cools after expanding through the rotor and doing work through the turbine. This cold air may, of course, be used for cooling the tooth.

It is intended that the novel turbine and air bearing structure of the invention not be limited to dental handpieces since it will be obvious to those skilled in the art that it may be utilized in other tools and/or applications.

Various changes which will now suggest themselves to those skilled in the art which may be made in the form, details of construction, and arrangement and connection of the elements without departing from the invention. It is, therefore, to be understood that the invention encompasses all forms thereof that come within the scope of the appended claims.

What is claimed is:

1. An inflow impulse turbine comprising, a hollow rotor having first and second frusto-conical end surfaces and a cylindrical surface therebetween, a hollow housing of complimentary symmetry as compared with said rotor separated from, and enclosing said rotor, the separation between said rotor and said housing being substantially uniform and of such dimension as to establish a hydrostatic film therebetween, a source of pressurized fluid communicating with the interior of said housing for establishing said hydrostatic film, the radial load on said rotor being supported by the complete film and the end thrust loads on said rotor being supported by the film at the frusto-conical end surfaces, nozzle means communicating the interior of said housing with the interior of said rotor, exhaust passage means communicating the interior of said rotor with the exterior of said housing, whereby rotary motion may be imparted to said rotor as a result of the passage of said pressurized fluid from the space between the housing and the rotor through said nozzle means.

2. An inflow impulse turbine as defined in claim 1 having an annular passage interrupting said film for providing a manifold in conjunction with said nozzle means.

References Cited in the file of this patent
UNITED STATES PATENTS

| | | |
|---|---|---|
| 760,441 | Fritz | May 24, 1904 |
| 2,605,619 | Serduke | Aug. 5, 1952 |
| 2,945,299 | Fritz | July 19, 1960 |